Figure 1:
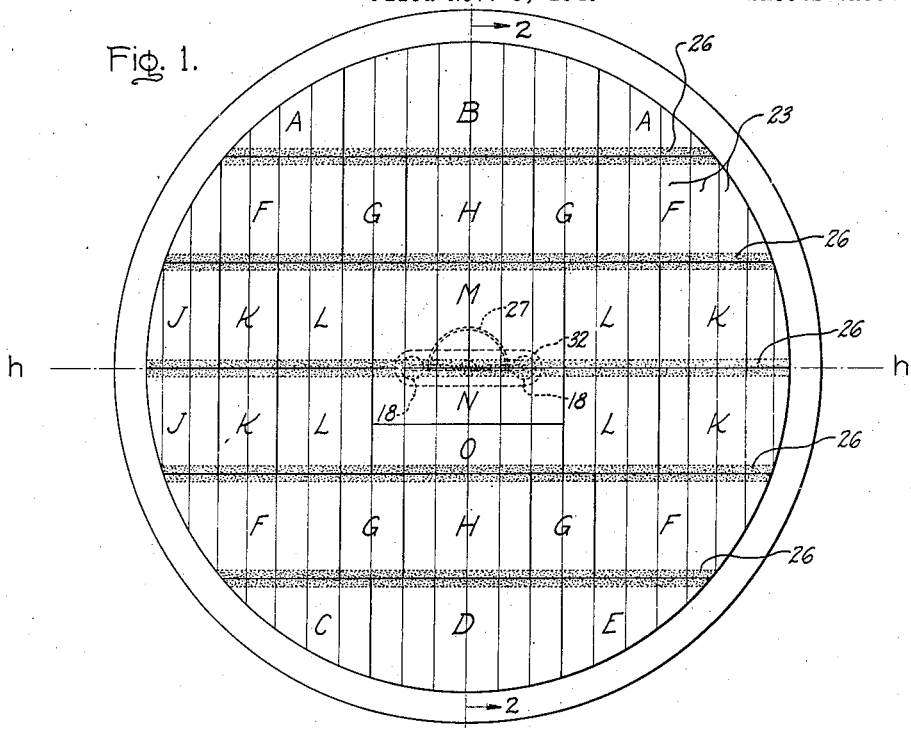

March 24, 1942.    K. D. SCOTT ET AL    2,277,563
VEHICLE HEADLAMP
Filed Nov. 9, 1940    2 Sheets-Sheet 1

Inventors:
Kenneth D. Scott,
Daniel K. Wright,
by John H. Anderson
Their Attorney.

March 24, 1942.   K. D. SCOTT ET AL   2,277,563
VEHICLE HEADLAMP
Filed Nov. 9, 1940   2 Sheets-Sheet 2

Inventors:
Kenneth D. Scott,
Daniel K. Wright,
by John H. Anderson
Their Attorney.

Patented Mar. 24, 1942

2,277,563

UNITED STATES PATENT OFFICE 2,277,563

VEHICLE HEADLAMP

Kenneth D. Scott and Daniel K. Wright, Cleveland Heights, Ohio, assignors to General Electric Company, a corporation of New York Application November 9, 1940, Serial No. 365,022

4 Claims. (Cl. 240—41.3)

Our invention relates in general to vehicle headlights such as are used on automobiles to illuminate the roadway. More specifically, our invention relates to a non-glaring vehicle headlight especially useful when driving in foggy or adverse weather.

Vehicle headlamps and so-called "fog" lamps in general use at present comprise a reflector, a light source such as a small electric incandescent lamp mounted within the reflector, and a light-transmitting lens covering the open end or mouth of the reflector and provided with various flutes and vertically light-bending prisms to spread and refract the rays of light in the desired manner. More recently, lamps of the "sealed beam" type have come into widespread use in which a glass reflector section is sealed by fusion to a glass lens to thereby form a sealed bulb within which an incandescible filament is mounted. In both types of lamps, however, there is a certain amount of uncontrolled light, part of which is directed upwardly above the horizontal. The sources of this uncontrolled light are many, particularly in the case where a separate lamp unit is mounted within the reflector, but the principal sources are the bases of the prisms on the lens, especially where down-bending prisms are employed, and the direct rays from the light source itself. The uncontrolled light, besides producing undesirable glare rays which impair the vision of approaching drivers, is particularly annoying when driving in foggy weather inasmuch as it produces a nimbus of illuminated fog particles of which that portion above the horizontal acts to greatly impair the driver's visibility of the roadway, because of the reflection of some of the light rays back into the eyes of the driver.

One object of our invention is to provide a vehicle headlamp in which substantially all the uncontrolled light is eliminated from the light beam.

Another object of our invention is to provide a vehicle headlamp in which substantially all upwardly directed rays of light are eliminated from the light beam.

Still another object of our invention is to provide a highly efficient fog lamp which will provide considerably better visibility of the roadway, when driving in foggy weather, than that heretofore obtainable.

A further object of our invention is to provide a fluted prismatic lens for vehicle headlamps having substantially no inherent sources of upwardly directed or glare rays.

A still further object of our invention is to provide a vehicle headlamp having a fluted prismatic lens and which will produce a light beam characterized by the absence therefrom of substantially all upwardly directed light rays.

A feature of the invention is the coating of all the draft surfaces, corners and edges at the bases of the horizontally-extending vertical-bending prisms on the lens with an opaque material at least the rearwardly facing surface of which, i. e., that surface of the opaque coating facing the headlight reflector, is made non-reflecting to thereby absorb the light rays falling thereon. Another feature of the invention is the use of a light-absorbing shield arranged within the reflector forwardly of and above the light source or filament for the purpose of shielding all direct rays emanating from the light source in an upward direction above the horizontal.

Figure 2:
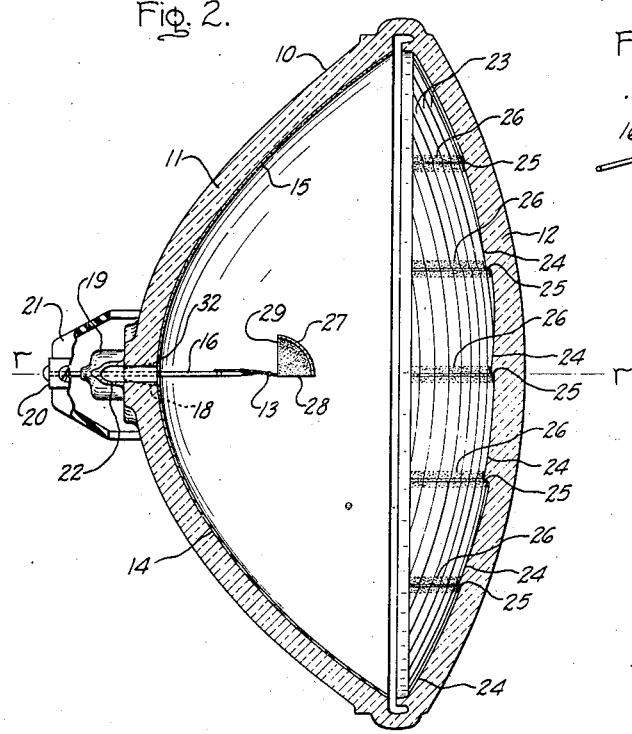
Figure 3:
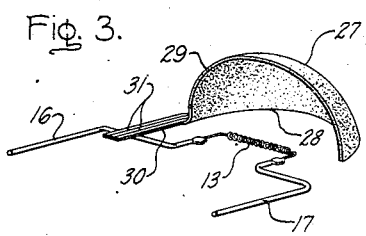
Figure 4:
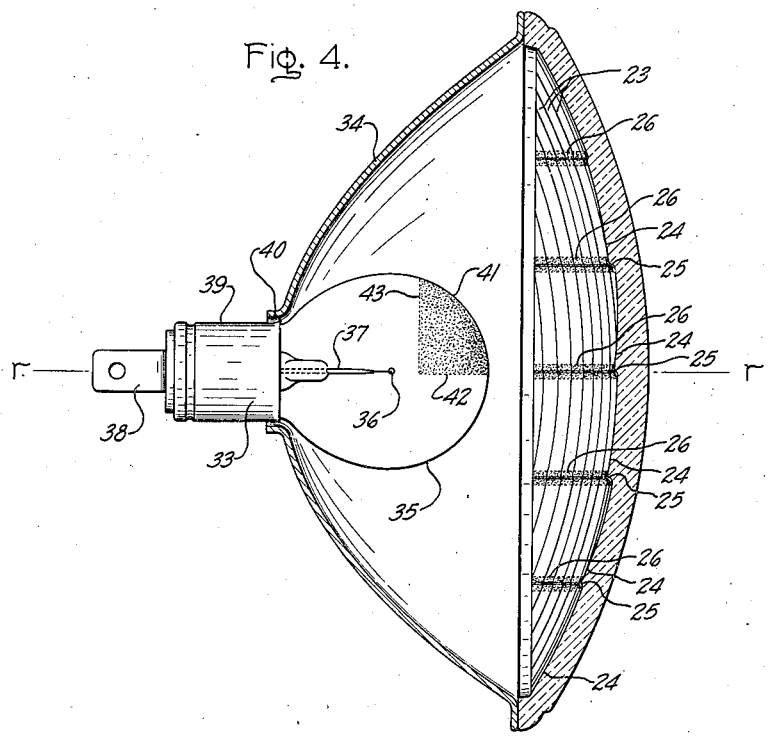
Figure 5:
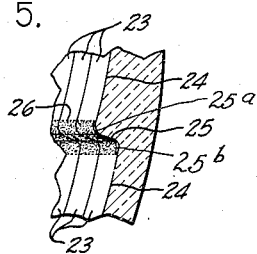

Further objects and advantages of our invention will appear from the following description of species thereof and from the accompanying drawings in which:

Fig. 1 is a front view of a vehicle headlamp or fog lamp comprising our invention; Fig. 2 is a vertical sectional view taken on the line 2—2 of Fig. 1; Fig. 3 is a fragmentary perspective view of the filament mount and the associated light shield; Fig. 4 is a view similar to Fig. 2 of a modified form of vehicle headlight comprising our invention; and Fig. 5 is a fragmentary view, on an enlarged scale, of a portion of the lens according to the invention.

Referring to Figs. 1–3, the invention is there shown as applied to a vehicle headlamp of the "sealed beam" type such as described and claimed in United States Patents No. 2,148,314 and No. 2,148,315, issued February 21, 1939, to D. K. Wright. The lamp comprises a sealed bulb or envelope 10 consisting of a pressed glass reflector section 11 and a cover glass or lens 12 sealed together at their peripheries by fusion, and an electrical energy translation element or filament 13 in the form of a coil or coiled-coil of a suitable refractory metal, preferably tungsten, mounted within the envelope. The inner surface 14 of the reflector section 11 is shaped to conform to a paraboloid, and is provided with a coating 15 of suitable reflecting material, such as aluminum or silver, to thereby form a reflecting surface. The filament 13 is preferably in the form of a linear coil mounted substantially at the focus of the reflecting surface 15, and extending transversely of the reflector axis $r$—$r$ and lying in the horizontal axial plane $h$—$h$ of the reflector. The filament is firmly supported in this position by means of a pair of leading-in wires 16, 17 to which the ends of the filament are electrically connected. The said leading-in wires 16, 17 extend through openings 18 in the reflector section 11 adjacent the apex thereof, and are hermetically sealed through metal cups or thimbles 19 which are sunk and fused into the glass around the said openings 18 so as to form a hermetic seal therebetween. The outer ends of the leading-in wires 16, 17 are connected to terminals 20 on a base 21 secured to the rear of the reflector section 11 at the apex thereof. The bulb or envelope 10 is evacuated and filled with gas by means of an exhaust tube 22 located at the apex of the reflector section 11, the said tube afterwards being tipped off, as shown in Fig. 2.

The cover glass or lens 12 is provided with suitable vertically extending flutes 23 adapted to spread the light rays horizontally, and suitable horizontally extending prisms 24 adapted to bend or refract the light rays vertically. The flutes and prisms are preferably formed on the inner surface of the lens 12, although they may be provided on the outer surface if desired. The said prisms 24 are preferably arranged in a series of horizontal rows extending entirely across the lens so that the bases or intersections 25 of the prisms form a series of horizontal bands extending entirely across the lens. Normally, glare is caused by the lens action of the corners or edges 25a and fillets 25b at the bases 25 of the prisms. As more fully explained in the Howard et al. Patent No. 2,177,216, the said edges and fillets concentrate horizontal light rays into upwardly directed individual beams.

In accordance with the invention, all the draft surfaces, corners or edges 25a, and fillets 25b (Fig. 5) comprising the bases or intersections 25 of the prisms 24 are coated with a suitable opaque material such as graphite, having a non-reflecting surface facing the reflector, to thereby form a series of horizontally extending narrow opaque bands 26. As a result, all the light rays that normally would strike such draft surfaces, corners and edges at the bases or intersections of the prisms, and which would result in uncontrolled light, are completely absorbed by the opaque bands 26 of graphite, such material providing a dull black surface from which there is practically no reflection of the rays back onto the reflecting surface 15. Thus, all sources of uncontrolled light within the lens 12 itself are entirely eliminated. Instead of graphite, other suitable opaque materials, such as copper, silver or aluminum, may be used as the coating material. However, where the surfaces of the coating material are normally reflecting in character, then those surfaces of the opaque bands facing the reflector 11 must be suitably treated, for instance by oxidation thereof, to render the same non-reflecting, otherwise the light rays striking such bands would be reflected back onto the reflector 11 and then again reflected into the beam as uncontrolled light. The graphite coating 26 is applied to the lens 12 by spraying a graphite solution thereon and allowing the same to dry, a mask being used during the spraying process to insure that only the desired lens surfaces, i. e., the prism bases 25, are coated with the graphite solution.

To eliminate from the light beam all upwardly projected direct rays from the filament 13, a relatively small and preferably non-reflecting light shield 27 is mounted in front of and above the filament 13, the shield being so shaped and arranged as to intercept all the direct rays from the filament which are directed upwardly above the horizontal plane through the lowermost portion of the filament, i. e., all those direct rays substantially within the half-cone of light defined by the filament (as the vertex), the upper half of the periphery of the reflecting surface 15, and the horizontal plane through the filament. The shield 27 may be made of any suitable shape or form which will accomplish the intended purpose, but is preferably shaped as a lune, preferably in the form of a quadrant of a hollow sphere, with its concave surface facing the filament. The shield is positioned with one edge 28 disposed substantially in a horizontal plane passing through the lowermost portion of the filament and the other edge 29 disposed substantially in a vertical plane extending transversely of the lamp axis r—r. The edge 29 is so located with respect to the filament as to insure the cutting-off by the shield of all the upwardly projected direct rays of the filament without causing any appreciable interference with the rays directed towards the reflecting surface 15. It will be obvious that, instead of forming the shield 27 in the shape of a lune, it may consist merely of a half-disc or semi-circular plate suitably mounted in front of and above the filament to cut off the direct rays therefrom in the intended manner.

The shield 27 thus provides means simple in construction for cutting out the direct rays from the lamp filament which hinder visibility to the driver of the vehicle in foggy or adverse weather and which also cause dangerous glare to a pedestrian or driver of another vehicle approaching, without at the same time materially diminishing the total illumination from the headlamp. This result arises from the fact that the shield 27 does not cut off the light rays to the reflector, these rays being reflected outwardly from the headlamp without hindrance, just as in the case of an ordinary headlamp.

Inasmuch as the shield 27 is preferably non-reflecting in character, no particular care is necessary as to the mounting of the shield with respect to the filament 13 since there is no reflection of light therefrom back onto the reflecting surface 15. The only requirement, in such case, is that the shield be properly mounted so as to intercept the direct rays from the filament in the desired manner. However, where the shield 27 is made reflecting in character, then in such case the shield is preferably mounted with its center of curvature slightly above the filament so that any light reflected by the shield is condensed at a point above the focus of the reflector and, on striking the reflecting surface 15, is deflected downwardly in the beam in the same manner as would obtain if the filament were mounted above focus.

The light shield 27 is supported in position by means of a support arm 30 (Fig. 3) which is welded to one or the other of the leading-in wires 16, 17. The shield 27 and the arm 30 are preferably formed as one piece by stamping from a thin strip of nickel, the arm being stamped with longitudinally extending ribs 31 for strengthening purposes. The shield is provided with a coating of suitable material to render it non-reflecting. For this purpose we prefer to employ a dull black non-reflecting ceramic material, although other materials, such as "Aquadag," may be used instead. The ceramic material is applied to the shield 27 in the form of a solution, after the shield has been first cleaned of oil and other foreign matter by etching with acid. The coated shields are then fired in an oven, resulting in the formation of a hardened dull black ceramic coating on the shield.

To further minimize the amount of uncontrolled light emanating from the lamp, a small portion of the inner surface 14 of the reflector section 11 at the apex thereof, including the holes 18 through which the leading-in wires pass and the hole formed by the exhaust tube 22, is left free of reflecting material 15, as shown at 32. As a consequence, the reflection of light from the rounded corners of such holes and the inaccurate surfaces thereadjacent is greatly minimized, thus practically eliminating such areas as sources of uncontrolled light.

The combination, in accordance with the invention, of the opaque bands or coatings 26 on the lens, and the light shield 27, as well as the non-reflecting area 32 at the apex of the reflector section 11, thus insures the elimination of practically all uncontrolled light from the light beam and provides a headlamp which, when equipped with a lens of proper design and mounted and aimed in the proper manner, will project a beam of light located entirely below the horizontal and having no upwardly directed rays above the horizontal whatsoever. Such a beam is especially suitable and effective for driving in foggy or adverse weather, for there are no upwardly directed rays illuminating the fog particles above the horizontal so as to cause a blinding of the driver by the reflection of such rays back into the eyes of the driver. Furthermore, such a beam is very effective as a traffic or passing beam because of the absence therefrom of all upwardly directed light rays which would normally produce glare and impair the vision of approaching drivers. Obviously, to obtain the full advantages of such a beam for driving in foggy weather, the beam should not be supplemented in any way by any other light beam from other lamps on the vehicle which would project upwardly directed rays of light.

Although any suitable lens and deflector arrangement may be employed to project a controlled beam of light below the horizontal, the lens 12 preferably employed is one commonly referred to as a traffic or passing lens and having the following prescription:

| Area | Horizontal prism | Horizontal spread | Vertical prism |
|---|---|---|---|
| A | ½° up | 8° | 3° right. |
| B | ½° up | 1° | ½° right. |
| C | 1½° down | 12° | None. |
| D | 1° down | 24° | None. |
| E | 1½° down | 24° | None. |
| F | ½° up | 6° | 3° right. |
| G | ½° up | 3° | 1½° right. |
| H | ½° down | 4° | 4° right. |
| J | ½° up | 1° | ½° left. |
| K | ½° up | 1° | 1½° left. |
| L | ½° up | 1° | 1½° right. |
| M | 2° down | 18° | None. |
| N | 3° down | 24° | None. |
| O | 2° down | 24° | None. |

When the lamp 10 is provided with a lens conforming to the above prescription, and the lamp is aimed slightly downward and to the right so that the axis r—r of the reflector is directed approximately two degrees down from the horizontal and approximately three degrees to the right of the vertical, then a beam will be projected the top of which, in the lower right quadrant is substantially coincident with the horizontal, and in the lower left quadrant is depressed approximately two degrees or thereabouts below the horizontal.

It will be observed that the lens 12 according to the above prescription has a number of vertical prisms for bending the light rays either to the left or to the right. Inasmuch as the bases or intersections of some of these vertical prisms refract the light rays to the left where they are somewhat objectionable from the point of view of an approaching driver, it may therefore be desirable, where the lamp is to be used as a passing lamp, to also opaque the bases or intersections of such left bending prisms.

Fig. 4 illustrates one way in which the invention may be applied to a headlamp employing a separate lamp 33 mounted within a separate metal reflector 34. The lamp 33 comprises a small sealed bulb 35 containing a filament 36 similar to the filament 13 in Figs. 1–3 and electrically connected by leading-in wires 37 to the terminals 38 of a base 39. The lamp 33 is mounted in the reflector 34 with the base 39 extending through an opening 40 in the reflector at the apex thereof, and with the filament 36 disposed approximately at the focus of the reflector, the same as in the previous form of the invention. The reflector 34 likewise has the same shape as that of the reflecting surface 15 in Figs. 1–3, i. e., paraboloidal so as to reflect the rays from the filament forwardly in a direction substantially parallel to the reflector axis r–r. The mouth of the reflector 34 is covered by a lens 12 of the same prescription as the lens 12 in Figs. 1–3 and provided with similar opaque bands or coatings 26 on the prism bases 25.

To intercept the direct rays from the filament 36 which are directed upwardly above the horizontal plane through the lowermost portion of the filament, a portion of the upper half of the tip or bowl portion of the bulb 35 is provided with a coating 41 of opaque material similar in configuration to the shield 27 in Figs. 1–3, the lower edge 42 of the coating lying in a horizontal plane through the lowermost portion of the filament and the upper edge 43 lying in a transverse plane slightly forward of the filament so that the coating intercepts only the upwardly projected direct rays from the filament and does not cut off the rays which are directed towards the reflector 34. The coating material employed is preferably one which will not reflect light, such as a dull black ceramic material fired onto the glass bulb.

While we have shown and described the invention in connection with a headlamp having only a single light source, it may be advantageously employed in headlamps having two light sources, such as are in widespread commercial use at present, where one filament is disposed slightly above the other and is used to produce a passing beam, while the lower filament is used to produce a driving beam. In such a headlamp, the shield 27 or 41, as the case may be, is arranged to intercept all the upwardly projected direct rays from the upper or passing beam filament only. Obviously, a certain proportion of the upwardly projected direct rays from the lower or driving beam filament will also be intercepted by the shield, but such rays form a very small proportion of the total amount of light in the driving beam. With such a two filament arrangement, a headlamp is provided which will produce an efficient driving beam as well as an especially efficient passing beam which is, furthermore, particularly effective for driving in foggy weather because of the absence therefrom of all upwardly directed rays of light.

What we claim as new and desire to secure by Letters Patent of the United States is:

1. A light projecting device comprising a light-concentrating reflector, a light source mounted in definite relation to said reflector, and a lens covering the mouth of said reflector and having one of its surfaces divided into a plurality of horizontal rows of horizontally extending prisms for bending the light rays from said reflector in a vertical direction, said prisms having base portions separating adjacent rows of prisms, said base portions having rounded edges and fillets which normally concentrate horizontal light rays into upwardly directed individual beams, a plurality of horizontal bands of opaque material on said lens entirely covering the said base portions of said prisms including said edges and fillets, and a light shield located adjacent said light source and constructed and arranged to intercept substantially all direct rays therefrom which are directed upwardly beyond the periphery of said reflector and above a horizontal plane through said light source.

2. A light projecting device comprising a sealed envelope including a concave glass reflector portion and a glass lens portion sealed together at their peripheries by fusion, said lens having on one of its surfaces a plurality of vertically spaced horizontally extending prisms for bending the light rays from said reflector portion in a vertical direction, the bases of said prisms having rounded edges and fillets which normally concentrate horizontal light rays into upwardly directed individual beams, a light source mounted within said envelope in definite optical relation to said reflector portion, a covering of opaque material on the base portion of said prisms including said edges and fillets and having a non-reflecting surface facing said reflector portion, and a relatively small light shield located adjacent said light source and constructed and arranged to intercept substantially all direct rays therefrom which are directed upwardly beyond the periphery of the reflector portion and above a horizontal plane through said light source.

3. A light projecting device comprising a light-concentrating reflector, a lens covering the mouth of said reflector and having on one of its surfaces a plurality of vertically spaced horizontally extending prisms for bending the light rays from said reflector in a vertical direction, said base portions having rounded edges and fillets which normally concentrate horizontal light rays into upwardly directed individual beams, a coating of opaque material on the base portions of said prisms including said edges and fillets and having a non-reflecting surface facing said reflector, and an electric incandescent lamp mounted in said reflector, said lamp comprising a relatively small sealed bulb and a concentrated filament within said bulb and disposed in definite optical relation to said reflector, said bulb having a coating of opaque material on the upper front portion thereof arranged to intercept substantially all direct rays from said filament which are directed upwardly beyond the periphery of said reflector and above a horizontal plane through said filament.

4. A light projecting device comprising a sealed envelope including a concave glass reflector portion and a glass lens portion sealed together at their peripheries by fusion, a light source mounted within said envelope in definite optical relation to said reflector portion and having its opposite ends connected to a pair of leading-in wires extending through openings in said reflector portion located adjacent the vertex thereof, a coating of reflecting material on substantially the entire inner surface of said reflector portion except for a small area at the vertex thereof within which the said openings are included, said lens having on one of its surfaces a plurality of vertically spaced horizontally extending prisms for bending the light rays from said reflector portion in a vertical direction, said base portions having rounded edges and fillets which normally concentrate horizontal light rays into upwardly directed individual beams, a covering of opaque material on the base portions of said prisms including said edges and fillets and having a non-reflecting surface facing said reflector portion, and a relatively small light shield located adjacent said light source and constructed and arranged to intercept substantially all direct rays therefrom which are directed upwardly beyond the periphery of said reflector portion and above a horizontal plane through said light source.

KENNETH D. SCOTT.
DANIEL K. WRIGHT.